United States Patent [19]

Munsen et al.

[11] 4,392,623
[45] Jul. 12, 1983

[54] FUSED CONNECTION ADAPTED TO FAIL UNDER DIFFERENT OVERLOADS ACTING IN DIFFERENT DIRECTIONS

[75] Inventors: Victor A. Munsen, Seattle; John R. McClaflin, Kent, both of Wash.

[73] Assignee: The Boeing Company, Seattle, Wash.

[21] Appl. No.: 218,957

[22] Filed: Dec. 22, 1980

[51] Int. Cl.³ .............................................. B64C 25/10
[52] U.S. Cl. ................................ 244/102 R; 244/131; 403/2
[58] Field of Search ........... 244/100 R, 102 R, 102 A, 244/131; 403/2; 64/28 R; 188/376; 280/451; 253/133, 149, 150, 151, 155

[56] References Cited

U.S. PATENT DOCUMENTS

| | | |
|---|---|---|
| 1,941,348 | 12/1933 | Hathorn .............................. 244/131 |
| 2,082,598 | 6/1937 | Saulnier . |
| 2,123,113 | 7/1938 | Levy . |
| 2,182,333 | 12/1939 | Cowey . |
| 2,318,568 | 5/1943 | Wintermute et al. . |
| 2,391,275 | 12/1945 | Shaw . |
| 2,415,615 | 2/1947 | Wallace . |
| 2,437,135 | 3/1948 | Steinhoff et al. ................ 244/102 R |
| 2,440,068 | 4/1948 | Beringer . |
| 2,468,669 | 4/1949 | Holmes ............................... 280/451 |
| 2,474,694 | 6/1949 | Saulnier . |
| 2,476,610 | 7/1949 | Linscott . |
| 2,559,451 | 7/1951 | McBrearty . |
| 2,562,778 | 7/1951 | Egly . |
| 2,630,990 | 3/1953 | Kanode et al. . |
| 2,633,037 | 3/1953 | Westbury . |
| 2,641,423 | 6/1953 | Harriman et al. . |
| 2,659,555 | 11/1953 | Schlender . |
| 2,750,134 | 6/1956 | Hawkins, Jr. et al. . |
| 2,997,261 | 8/1961 | Westcott, Jr. . |
| 3,060,706 | 10/1962 | Hess .................................... 64/28 R |
| 3,185,413 | 5/1965 | Walker . |
| 3,304,031 | 2/1967 | Mulquin . |
| 3,602,065 | 4/1970 | Ratcliff . |
| 3,716,208 | 2/1973 | Fagan et al. . |
| 3,967,906 | 7/1976 | Strizki . |
| 3,982,408 | 9/1976 | Wright . |
| 4,065,077 | 12/1977 | Brooks . |
| 4,086,012 | 4/1978 | Buckley et al. ........................ 403/2 |
| 4,087,062 | 5/1978 | Masclet . |
| 4,155,522 | 5/1979 | Sealey ............................ 244/102 R |

FOREIGN PATENT DOCUMENTS

| | | |
|---|---|---|
| 732203 | 2/1943 | Fed. Rep. of Germany . |
| 2004453 | 8/1970 | Fed. Rep. of Germany ... 244/102 R |
| 1467923 | 12/1965 | France . |

Primary Examiner—Charles E. Frankfort
Attorney, Agent, or Firm—Delbert J. Barnard; Eugene O. Heberer; Joan H. Pauly

[57] ABSTRACT

The front bearing for a landing gear trunion is carried by a rear wing spar and the rear bearing is carried by a landing gear beam which is pivotly attached at its inner end to the body frame. A main attach pin pivotally connects the outer end of such beam to a pair of connector plates, one located on each side of the connection. A pair of shear pins connect the connector plates to a short cantilever beam which is connected to and projects inwardly from the rear wing spar, generally in line with the landing gear beam. One of the shear pins is positioned generally horizontally outwardly from the main attach pin. The second shear pin is positioned generally vertically below the main attach pin. Generally vertical overloads are carried by the lower shear pin load and such shear pin is designed to fracture in response to a load slightly below the vertical load reacting capability of the reaction structure. Generally horizontal overloads are carried by the upper pin or by both pins together which are sized to break under loads slightly below the horizontal load reacting capability of the reaction structure.

21 Claims, 8 Drawing Figures

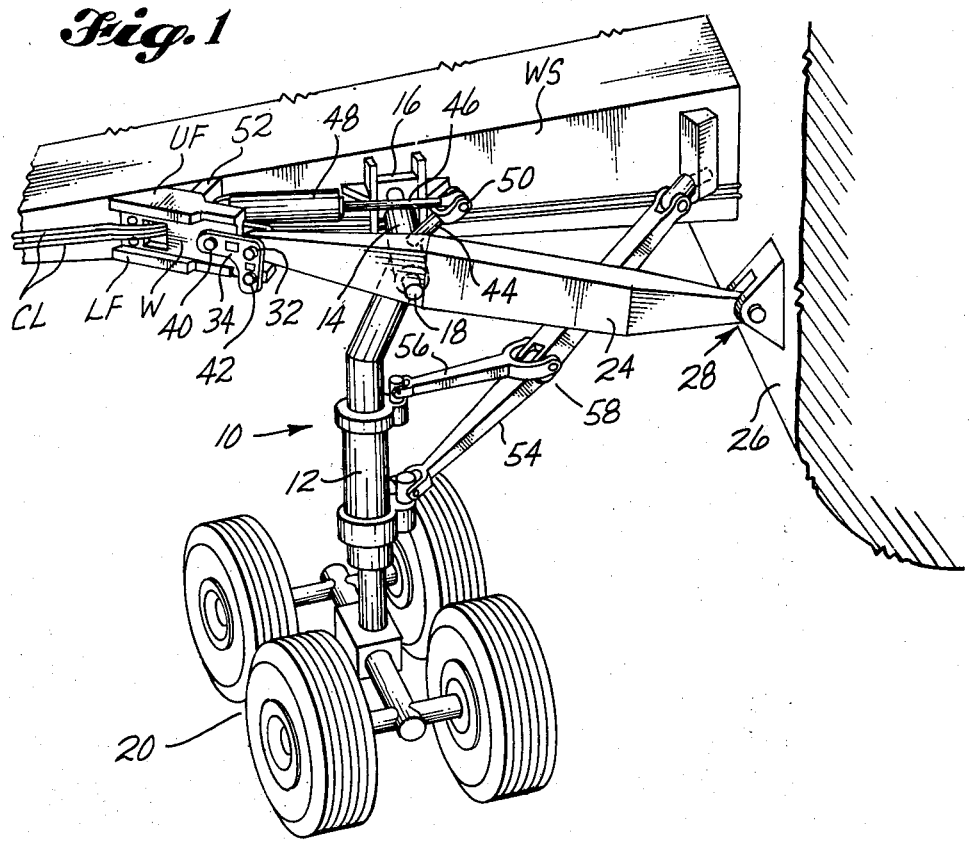
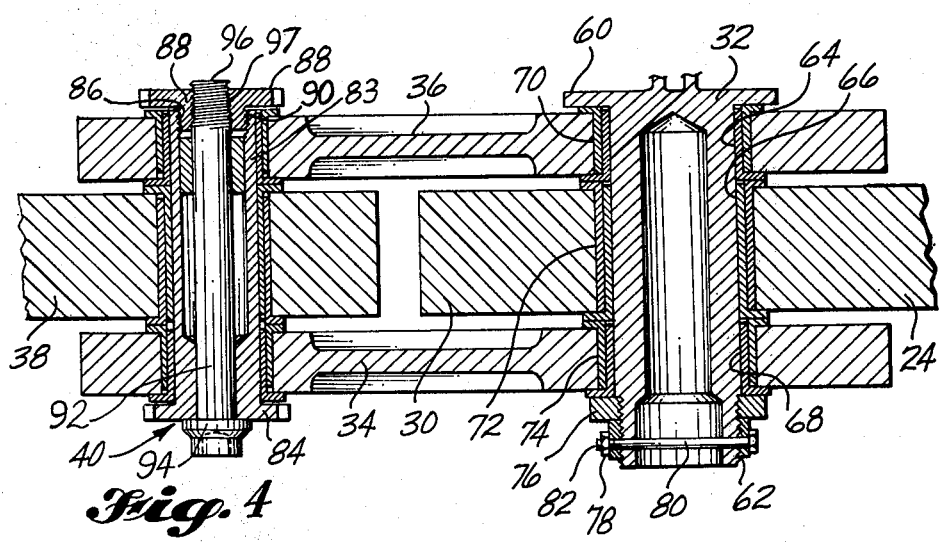

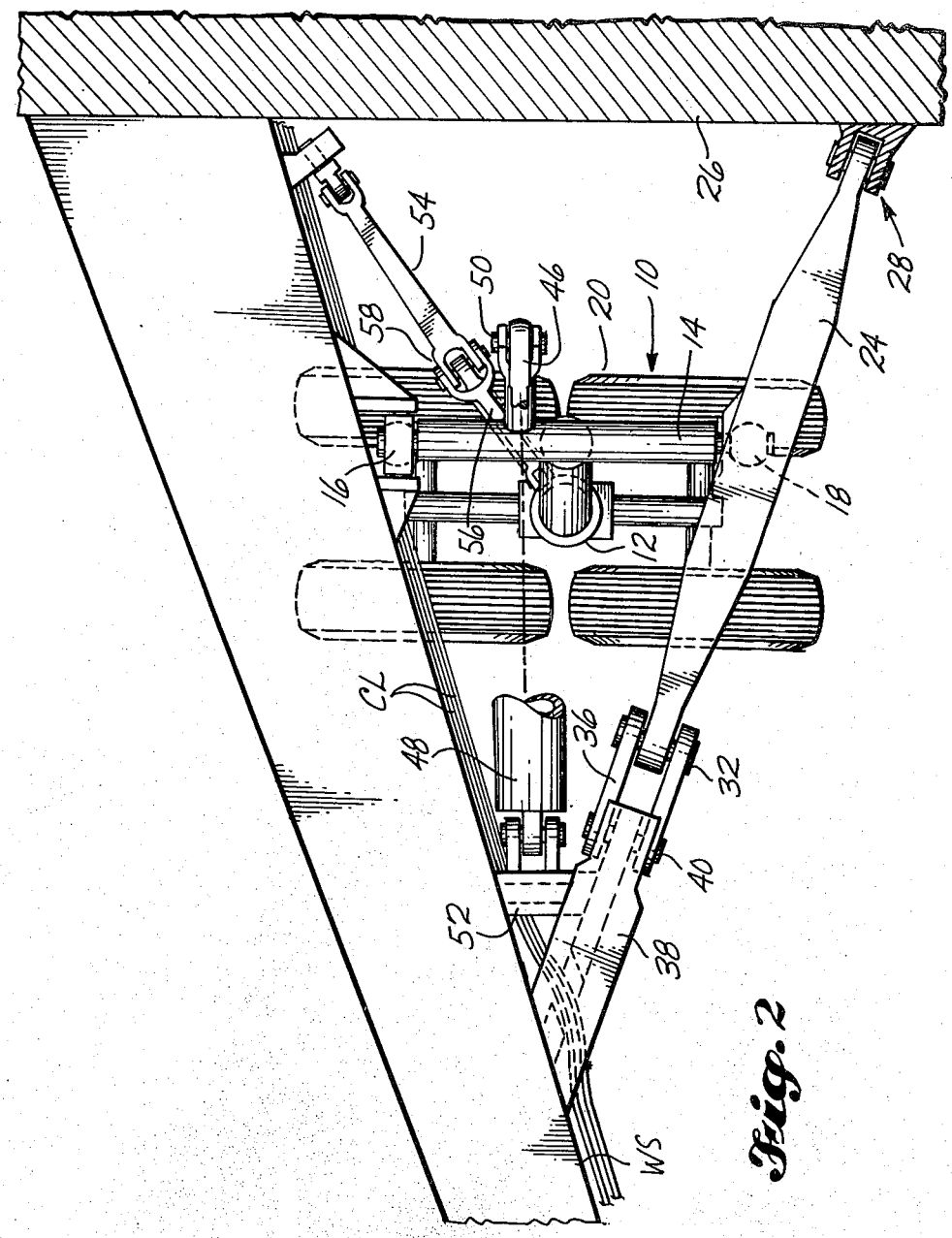

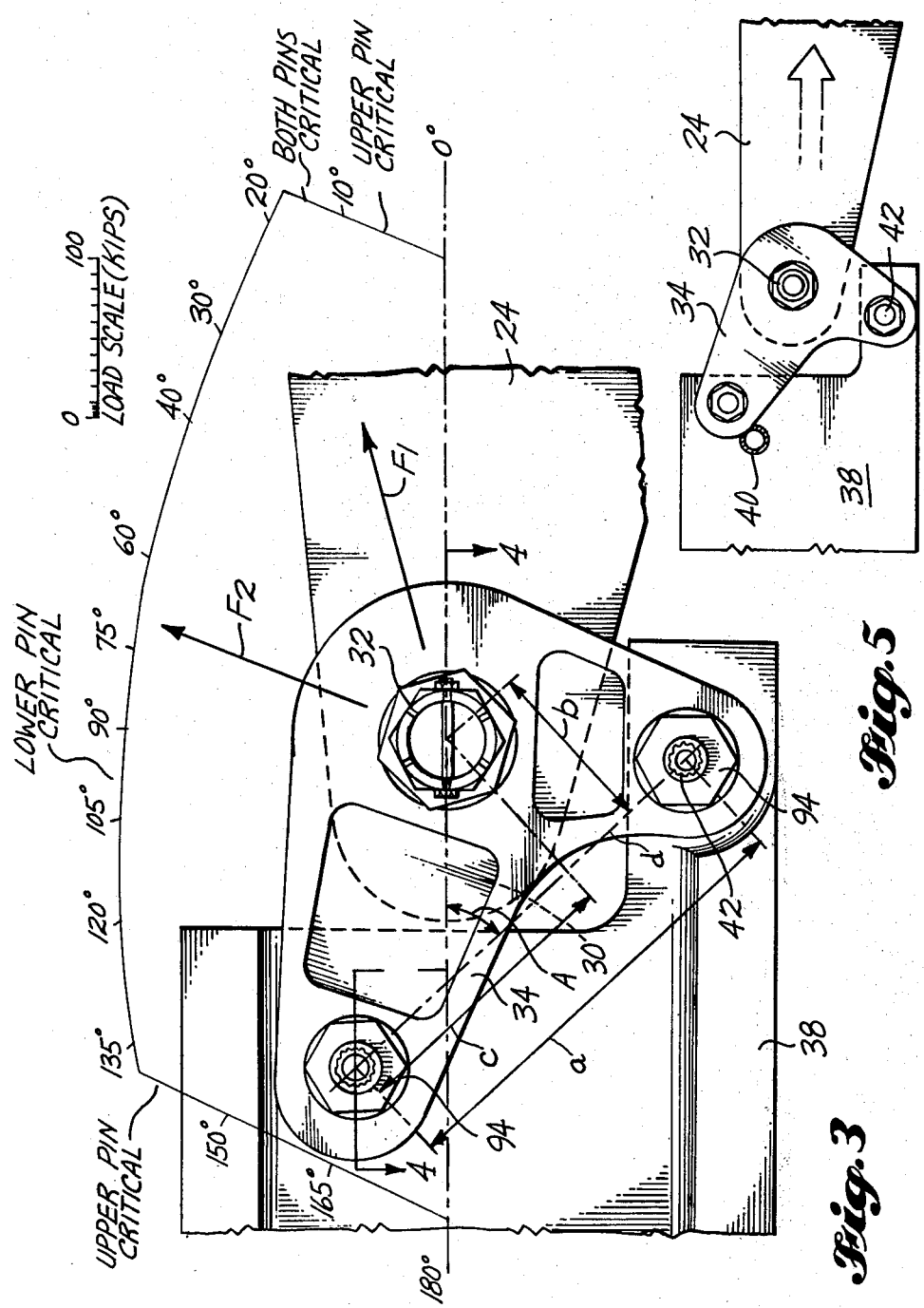

FUSED CONNECTION ADAPTED TO FAIL UNDER DIFFERENT OVERLOADS ACTING IN DIFFERENT DIRECTIONS

FIELD OF THE INVENTION

This invention relates to structural connections of a type designed to fail at a predetermined load value for the purpose of protecting the surrounding structure from overload, or for such other purposes as may be applicable.

BACKGROUND OF THE INVENTION AND DESCRIPTION OF PRIOR ART

The above described type connection is commonly known as a "fused" connection. The required function of predictable failure of the connection is usually accomplished by the shearing of a single shear pin of known load capacity which is located and oriented in such a manner as to provide the only load path between a loaded structure and a structure which will react such load.

A new and unique problem is presented, for which a conventional solution is unsatisfactory, when the load reaction structure is incapable of carrying an equal amount of maximum load in all directions. For example, a given load reaction structure may be capable of reacting a much larger force in a first (e.g. horizontal) direction than in a second (e.g. vertical) direction. The problem is that a conventional single shear pin connection knows no direction. That is, it has only one failure level and it will always fail at that level regardless of the direction of the overload. Thus, a single shear pin type fused connection is not a suitable solution for a fused joint when:

(1) Applied loads are of varied direction and magnitude with respect to the joint or pin axis.

(2) The load capacity of the reaction structure is not equal to the highest magnitude of the applied load in all directions.

(3) It is desirable or necessary to protect the load reaction structure from overload in directions of minimum capacity.

This problem has been encountered in aircraft design, at a connection between a landing gear support beam (loaded structure) and a wing frame (reaction structure). The wing frame is capable of reacting a much larger load in the horizontal direction than it is in the vertical direction.

The primary requirements of a fused connection between the main landing gear support beam and the wing of a particular new aircraft being built by The Boeing Company are:

1. a single pin attachment is required, 2. a clear and predictable break away of the joint is required with overload application in either the horizontal or vertical direction, 3. the applied loads which must be safely carried are approximately twice as large in the horizontal direction as those in the vertical direction, 4. the capacity of the supporting wing structure to react a load in the vertical direction is approximately one half of the support structure capability in the horizontal direction.

The fused single pin connection of the present invention meets these requirements.

SUMMARY OF THE INVENTION

In basic form, the fused single pin connection of the present invention comprises connector plate means; a main attach pin connecting said connector plate means to a first structural member; and a pair of shear pins connecting the connector plate means to a second structural member. The shear pins are positioned such that differences in the direction of applied load on the connector means changes the load distribution to the two shear pins.

Accordingly, it is an object of the present invention to provide a fused connection of the type described in which an overload in the direction of high load carrying capacity of the reaction structure will cause the connection to fail by fracturing either the strongest of two shear pins, or both shear pins, and an overload in the direction of low reaction capability of the reaction structure will cause the connection to fail by fracturing a single one of the shear pins which is designed to fracture in response to the smaller overload acting in such direction.

Another object of the invention is to provide a fused single pin connection between a reaction member and a loaded beam. The main attach pin connects the connector plate means to the loaded beam and the shear pins connect the connector plate means to the reaction member. In preferred form, one of the shear pins is positioned endwise outwardly of the beam from the main attach pin connection and the second shear pin is positioned laterally of the beam from the main attach pin connection. The maximum load reacting capacity of the reaction member is in a direction which is substantially coincident with the direction of extent of the loaded beam. A predictable failure of the connection in this direction requires a shearing of either the endwise positioned shear pin, which may be stronger than the other shear pin, or a shearing of both shear pins. A predictable failure of the connection in the direction of smaller reaction capability of the reaction member requires only shearing of the laterally positioned shear pin. In operation, a transverse overload on the loaded beam will first cause the laterally offset shear pin to fracture. After this happens the loaded beam will move in response to the applied load and as it moves the connector plate means will rotate about the other shear pin. Any overload remaining at the limits of such movement of the connector means would fracture the shear pin.

Another object of the present invention is to provide a fused single pin connection of the type described for use in an aircraft, between the outboard end of a landing gear support beam and a wing frame. In such an installation, the maximum load reacting capability of the reaction structure (the wing frame) is in the horizontal direction and the landing gear beam extends generally horizontally. One of the shear pins is spaced horizontally outwardly from the main attach pin and the second shear pin is positioned below the main attach pin. The lower pin is sized to fracture in response to a vertical overload applied on the connection, such as would occur if the aircraft were to set down sharply on its landing gear. Larger magnitude overloads in the horizontal direction (e.g. severe drag loads or a substantial horizontal impact on the landing gear during landing) would shear either a stronger shear pin, or both shear pins, depending on the particular design employed and/or the magnitude of the horizontal overload.

The objective in this case is to protect the fuel tank (primary wing structure) from rupture resulting from landing gear overload in either the vertical or horizontal direction.

Herein the term "connector plate means" is used to broadly describe the load transferring structure which is interposed between the loaded member and the reaction member. Such term is intended to read on both a plurality of members, such as illustrated, or only a single member.

These and other objects, advantages, and features of the present invention, will be apparent from the preferred embodiment described below.

BRIEF DESCRIPTION OF THE DRAWING FIGURES

Referring to the drawing wherein like reference characters designated like parts throughout the several views:

FIG. 1 is a pictorial view looking from above and toward the rear and one side of a landing gear assembly for an aircraft, with portions of the wing structure removed for the purpose of exposing the supporting beam structure for the landing gear which is housed within the wing, such view also showing an embodiment of the fused connection of the present invention;

FIG. 2 is a top plan view of the structure shown by FIG. 1, with a central portion of a hydraulic actuator used to move the landing gear between its extended and retracted positions being broken away for the purpose of exposing other parts which are located below it;

FIG. 3 is an enlarged scale elevational view of an embodiment of the present invention;

FIG. 4 is a sectional view taken substantially along line 4—4 of FIG. 3;

FIG. 5 is a view similar to FIG. 3, showing a failure of the upper shear pin in response to a generally horizontal load which exceeds the shear strength of such shear pin, and showing the connector plates rotated in position about the lower shear pin;

DESCRIPTION OF THE PREFERRED EMBODIMENT

Figure 6:
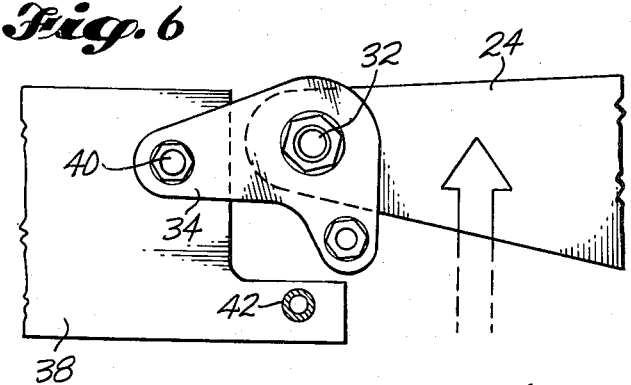
FIG. 6 is a view like FIG. 5, depicting failure of the lower shear pin in response to a generally vertical load and rotation of the connector plates about the upper shear pin.

In conventional fashion, the landing gear 10 per se comprises a strut 12 which depends from a trunnion member 14 having front and rear pivots 16, 18. The lower or free end of the strut 12 is connected to a wheel assembly 20.

The mounting beam structure for the trunnion member 14 constitutes the subject matter of a companion application of John R. McClaflin, Ser. No. 218,772, filed Dec. 22, 1980, entitled Combined Beam Support For Landing Gear. The disclosure of such application is hereby incorporated herein by this specific reference. In such system the forward bearing 16 is carried by the rear main wing spar 22. The rear trunnion bearing 18 is carried by a landing gear beam 24. Beam 24 is connected at its inner end to the aircraft body 26, by means of a knuckle pin joint 28, and is similarly connected at its outer end to the fused connection of the present invention.

As best shown by FIGS. 3-7, the outer end portion 30 of beam 24 is attached by means of a main attach pin 32 to a pair of connector plates 34, 36. Plates 34, 36 are of modified triangular form, i.e. they have three sides and three corners. The three corners are rounded and material is removed from the faces and on one side for the purpose of weight reduction. Connector plates 34, 36 are attached to a short beam 38 which projects in cantilever fashion from main spar 22. Plates 34, 36 are connected to beam 38 at two vertically and horizontally spaced locations, by means of shear pins 40, 42.

A lever arm 44 projects upwardly from trunion member 14 generally opposite from strut 12.

A yoke may be provided at the free end of lever arm 44 to receive between its two parts, in knuckel joint fashion, the free end portion of a piston rod 46 of an actuator 48, provided to move the landing gear assembly 10 between extended and retracted positions. A cross-pin 50 extends through the side parts of the yoke and through the end portion of the piston rod to pivotly connect such parts together. The opposite end of the actuator 48 is pivotly attached in similar fashion (see FIG. 2) to a short cross beam 52 which extends between rear main spar 22 and the short cantilever beam 38.

In preferred form, the landing gear includes a two part foldable strut 54 which extends diagonally from a lower portion of main strut 12 up to a point of connection with the main spar 2 that is closely adjacent the aircraft body 26. A fold control arm 56 extends from an intermediate portion of the main strut 12 to a pivot joint 58 near the center of the foldable strut 54. Arm 56 serves to fold and unfold strut 54 during movement of the wheel assembly 10 between its extended and folded positions.

The fold control arm 58 and two parts of strut 54 include pivot pin joints at each of their ends. These joints are of conventional construction and per se form no part of the present invention and for this reason they will not be described in any further detail.

As should be evident, a retraction of the actuator 48 will exert a pull on lever 44 and swing the wheel assembly 10 up into its folded or stowed position within the wing structure. An extension of actuator 48 will push against the lever 44 and cause the wheel assembly 10 to swing downwardly from its stowed position into its use or operative position. As strut 12 swings downwardly the brace arm 54 unfolds. When the wheel assembly 10 is in its operative position (FIG. 1) the two parts of the brace arm 54 are in alignment and the brace arm is capable of transmitting forces from the lower portion of the wheel strut 12 to the body end of rear main spar 22.

As best shown by FIG. 4, a typical embodiment of the main attach pin 32 includes a relatively flat head 60 at one of its ends and external threads 62 at its opposite end. The shank portion of pin 32 extends through a series of plain bearings or bushings 64, 66, 68 which are concentrically situated inside of a second set of bushings 70, 72, 74 which in turn fit snuggly within holes formed in the plates 34, 36 and in end portion 30 of beam 24. Radial flanges at the ends of the sleeves 64, 66, 68, 70, 72, 74 project radially outwardly a ways between adjacent side faces of elements 60, 36, 30, 34, 76 and function as bearings.

A jam nut 76 is threaded onto the threads 62. Then a lock nut 78 is applied. Finally, a cross-bolt 80 is installed through aligned openings in nut 78 and in the threaded end portion of pivot pin 32. Bolt 80 is secured in place by means of a nut 82.

Referring to FIG. 4, a typical shear pin 40 is shown to have a tubular body 83 having a relatively flat head 83 at one end and internal threads 86 at the opposite end. An internal nut 88 having an externally threaded shank portion 90 is threaded into the open end of shear pin 40. A bolt 92, having a flat head 94 at one end and a threaded portion 96 at its opposite end is inserted axially through the shear in 40, from the head end thereof, and at its oppossite end is threaded into the nut 88 at 97.

The typical shear pin assembly as described is of dual load path design wherein two separate shear pins are co-located upon a single axis with sufficient radial space between the outer surface of internal pin 92 and the inner surface external pin 40 to provide for predictable failure in series. (i.e. upon overload, shearing of pin 40 is nearly complete at the predicted value prior to contact between to above noted surfaces and consequent absorbtion of load by internal pin 92 which does not compromise the predicted failure load, but by virtue of nearly equal strength, provides an additional energy absorbing safety device with a predictable failure value) The primary purpose of this internal pin 92 is to provide a secondary means of carryng load should primary pin 40 suffer loss of capability by means of corrosion, material defect or repeated cycling of applied load beyond material endurance limits.

This secondary means of providing capacity to bear load at each shear pin connection is optional with respect to this invention dependent upon safety and redundancy requirements.

As shown, the shear pins 40, 42 are provided with concentric sleeve bearing sets like those used with the main attach pin 32.

Referring back to FIG. 1, a vertical drop of the aircraft during landing could apply a vertical overload on connection 32, 34, 36, 40, 42. The force of the wheels 20 hitting the runway would be transmitted by strut 12 to beam 24 and from beam 24 to main attach pin 32. A severe drag or horizontal impact force (such as wheels 20 striking an edge of the runway) would be reacted by beam 24 in a generally horizontal direction due in part to the presence of brace 54.

By way of typical and therefore non-limitive example, FIG. 3 shows an embodiment of the invention designed for use at the outer end connection of a landing gear support beam to a wing frame member. In this example the upper shear pin or fuse bolt 40 has a 195K capacity and a shear area of 1.346 square inches. The lower shear pin or fuse bolt 42 has a 162.4K capacity and a shear area of 1.121 square inches. The two shear pins 40, 42 are spaced 14.23 inches apart on center (dimension a). The angle A, measured between a horizontal line and a line d passing through the centers of the two shear pins 40, 42 is 46.5 degrees. The center of the main attach pin 32 is perpendicularly offset from such line a distance b of 5.54 inches. A distance c along line d, measured from shear pin 40, to the point of perpendicular intersect of such line a with a line b is 9.135 inches.

FIG. 3 includes a capacity polar for the fused connection with geometric features as defined above. Such polar is labeled to show the zones in which, for the specific example presented, the shear pins 40, 42 are operative. Also, such diagram is drawn to scale so that the magnitude of overload forces passing through the center of main attach pin 32 can be calculated in any direction between zero degrees and 360 degrees although the values are shown in the range of 0 to 180 degrees only.

FIG. 3 and FIGS. 5-8 illustrate the fused connection in operation.

FIG. 5 depicts what happens when an overload force is applied on the main attach pin 32 within the zone of zero degrees to about 17.5 degrees, labeled "upper pin critical" in FIG. 3. An overload acting in this zone causes the upper shear pin 40 to fracture first. Such fracturing frees the outer end of beam 24 and the connector means for a limited amount of upward pivotal movement. Fracturing of pin 40 alone may be all that is necessary in order to relieve a temporary applied overload. If the overload is still present when the parts reach their limits of movement, permitted by fracturing of pin 40, the second pin 42 will break.

Figure 7:
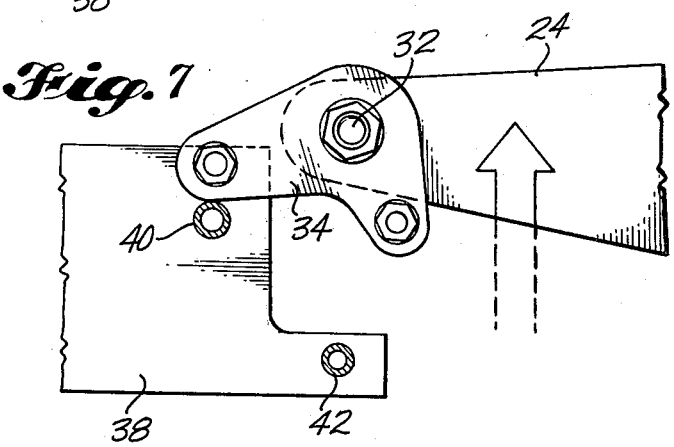
FIG. 7 is a view like FIGS. 5 and 6, depicting failure of the upper shear pin following rotational movement of the connector plates to the limit permitted by the connection after failure of the lower shear pin and in response to additional energy applied in a vertical direction.

FIGS. 6 and 7 depict operation of the connection under substantially vertical overload, acting in the zone labeled "lower fuse pin critical". The lower shear pin 42 breaks and the beam 24 and the connector plate means 34 swing upwardly. If when these parts reach their limit of travel the force on shear pin 40 exceeds its capacity, pin 40 will break, as shown by FIG. 7.

Figure 8:
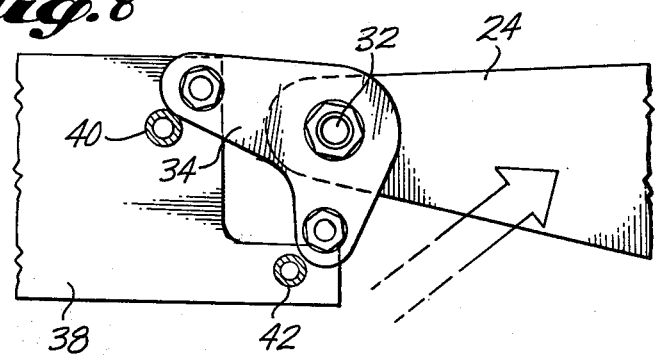
FIG. 8 is a view like FIGS. 5, 6 and 7, but showing a generally horizontal force on the joint which is from the beginning carried by both shear pins and which must break both shear pins in order to cause the joint to fail.

FIG. 8 depicts what happens when the overload is directed along a line coincident with the maximum reaction capacity of the reaction structure. In FIG. 3 this point on the polar is labeled "upper and lower fuse pins equally critical at this point". As shown by FIG. 8, what happens is that both pins are sheared by the overload.

In the illustrated embodiment the shear pins or fuse bolts 40, 42 are put into double shear. Accordingly, the connector plate means comprises two plate, one located on each side of the connection. In another installation it may be appropriate to put the shear pins in a single shear in which case the connector plate means may comprise a single plate located on one side of the connection. The illustrated embodiment is shown to be used at one end of a beam which has a pivot joint at each of its ends. In another installation it might be advantageous to employ the connection at one end of a beam which is relatively fixed at its opposite end, in which case the moment capability of the beam would have to be considered when computing the necessary capacity of the shear pins.

From the foregoing, further variations, adaptations and modifications in the environment structure and the details of construction of the connection components may be evolved by those skilled in the art to which the invention is addressed. Accordingly, the scope of protection of the invention is not to be determined by the details of the illustrated embodiment but rather by the terms of the appended claims.

What is claimed is:

1. A fused single pin connection between two structural members, comprising:
   connector plate means separate from said structural members;
   a main attach pin connecting said connector plate means to one of said structural members; and
   a pair of shear pins connecting said connector plate means to the other structural member, with the shear pins being positioned such that differences in the direction of applied load on the connector plate means changes the load distribution to the two shear pins.

2. A fused single pin connection according to claim 1, wherein said shear pins are sized in capacity and are positioned relative to each other and the main attach pin such that the maximum design load on the connection is applied on the main attach pin along a line situated generally between the two shear pins and a predictable overload failure will occur by the shearing of both shear pins.

3. A fused single pin connection between two structural members, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein each shear pin is offset from a line passing through the main attach pin and the other shear pin, so that a force acting on the connection generally in line with the main attach pin, and one of the shear pins, of a magnitude exceeding the load carrying capacity of such shear pin, will cause such shear pin to break, allowing rotation of the connector plate means about the second shear pin.

4. A fused single pin connection between two structural members, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein said connector plate means comprises a pair of connector plates overlapping portions of the two structural members on opposite sides of the connection, with the main attach pin extending through the first structural member and both connector plates, and with each shear pin extending through the second structural member and both connector plates.

5. A fused single pin connection between a loaded structural member and a reaction structural member, comprising:
connector plate means separate from said structural members;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins.

6. A fused single pin connection between a loaded structural member and a reaction structural member, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein each shear pin is offset from a line passing through the main attach pin and the other shear pin, so that a force acting on the connection generally in line with the main attach pin and one of the shear pins, of a magnitude exceeding the load carrying capacity of such shear pin, will cause such shear pin to break, allowing rotation of the connector plate means about the second shear pin.

7. A fused single pin connection between a loaded structural member and a reaction structural member, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein said connector plate means comprises a pair of connector plates overlapping portions of the two structural members on opposite sides of the connection, with the main attach pin extending through the first structural member and both connector plates, and with each shear pin extending through the second structural member and both connector plates.

8. A fused single pin connection between a loaded structural member and a reaction structural member, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein the two structural members are beams aligned generally end-to-end, wherein one of the shear pins and the main attach pin are aligned in the direction of extent of the two beams, and wherein the second shear pin is offset from the main attach pin in a direction extending laterally of the direction of extent of the two beams.

9. A fused single pin connection according to claim 8, wherein the loaded beam includes a pin joint at its end opposite the main attach pin.

10. A fused single pin connection between a loaded structural member and a reaction structural member, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein said shear pins are sized in capacity and are positioned relative to each other and the main attach pin such that the highest design load on the connection is applied on the main attach pin along a line situated generally between the two shear pins and a predictable overload failure will occur by the shearing of both shear pins.

11. A fused single pin connection between a loaded structural member and a reaction structural member, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins;
wherein the placement of the shear pins is such that a load imposed on the main attach pin generally in line with one of the shear pins, of a magnitude exceeding the load carrying capacity of such shear pin, will cause such shear pin alone to break, allowing the connector plate means to rotate about the second shear pin.

12. A fused single pin connection between two structural members, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins; wherein the two structural members are beams aligned generally end-to-end, wherein one of the shear pins and the main attach pin are aligned in the direction of extent of the two beams, and wherein the second shear pin is offset from the main attach pin in a direction extending laterally of the direction of extent of the two beams.

13. A fused single pin connection between two structural members, comprising:
connector plate means;
a main attach pin connecting said connector plate means to one of said structural members; and
a pair of shear pins connecting said connector plate means to the other structural member, with the shear pins being positioned such that differences in the direction of applied load on the connector plate means changes the load distribution to the two shear pins; wherein the placement of the shear pins is such that a load imposed on the main attach pin generally in line with one of the shear pins, of a magnitude exceeding the load carrying capacity of such shear pin, will cause such shear pin alone to break, allowing the connector plate means to rotate about the second shear pin.

14. A fused single pin connection according to any of claims 1, 3, 2, 4, 5 and 10-15, wherein the load carrying capacity of the two shear pins is different.

15. In an aircraft, a generally horizontally extending landing gear beam for supporting the rear end of a landing gear trunnion, said beam including pivot pin means connecting its inboard end to a body frame portion of an aircraft and its outer end to a wing frame means, and the improvement comprising a fused single pin connection between the outboard end of said beam and the wing frame means, comprising:
connector plate means;
a main attach pin connecting said connector plate means to the outboard end of said beam; and
a pair of shear pins connecting said connector plate means to the wing frame means with the shear pins being sized and positioned relating to each other and the main attach pin such that before failing the connection can withstand a substantially larger load in a generally horizontal direction than in a generally vertical direction.

16. The improvement of claim 15, wherein one of the shear pins is positioned generally horizontally outwardly from the main attach pin, and the second shear pin is positioned substantially vertically below the main attach pin.

17. The improvement of claim 16, wherein the first shear pin has a larger load carrying capacity than the second shear pin.

18. The improvement of claim 15, wherein said connector phase means comprises a pair of connector plates overlapping portions of the wing frame means and the landing gear beam on opposite sides of the connection, with the main attach pin extending through the landing gear beam and both connector plates, and with each shear pin extending through the wing frame means and both connector plates.

19. The improvement of claim 15, wherein said shear pins are sized in capacity and are positioned relative to each other and the main attach pin such that an overload in the direction of maximum load reacting capability of the wing frame means will shear either the upper shear pin or both shear pins.

20. The improvement of claim 19 wherein the upper shear pin has a larger load carrying capacity than the lower shear pin.

21. The improvement of claim 19, wherein the load carrying capacity of the lower shear pin is such that such shear pin will break in response to a vertical overload.

* * * * *

UNITED STATES PATENT AND TRADEMARK OFFICE
CERTIFICATE OF CORRECTION

PATENT NO. : 4,392,623
DATED : July 12, 1983
INVENTOR(S) : Victor A. Munsen and John R. McClaflin It is certified that error appears in the above-identified patent and that said Letters Patent are hereby corrected as shown below:

Column 5, line 15, "in" should be --pin--.

Claim 14, column 10, line 7, "1, 3, 2, 4, 5 and 10-15" should be --1-11--.

Claim 18, column 10, line 36, "phase" should be --plate--.

Signed and Sealed this

Thirteenth Day of December 1983

[SEAL]

Attest:

GERALD J. MOSSINGHOFF

Attesting Officer     Commissioner of Patents and Trademarks